UNITED STATES PATENT OFFICE.

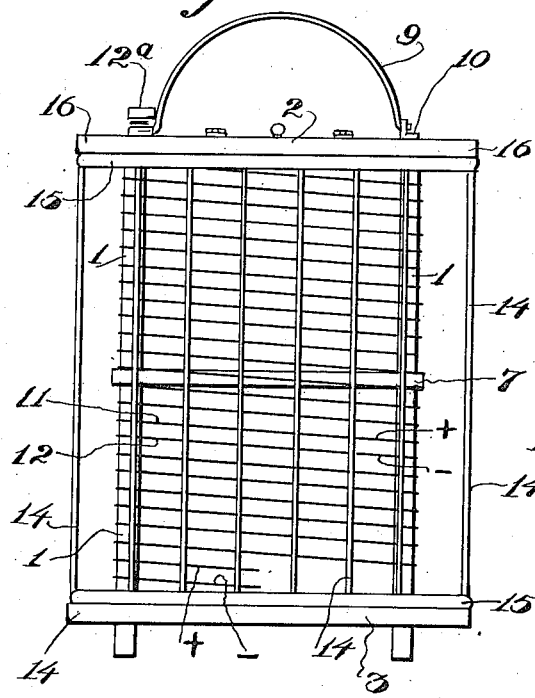

WILLIAM A. BASS, OF RIO VISTA, TEXAS.

ELECTRIC FLY-TRAP.

1,159,157.  Specification of Letters Patent.  Patented Nov. 2, 1915.

Application filed January 22, 1915. Serial No. 3,803.

*To all whom it may concern:*

Be it known that I, WILLIAM A. BASS, a citizen of the United States, residing at Rio Vista, in the county of Johnson and State of Texas, have invented certain new and useful Improvements in Electric Fly-Traps; and I do hereby declare the following to be a full, clear, and exact description of the invention, such as will enable others skilled in the art to which it appertains to make and use the same.

This invention is an improved electric fly trap by means of which flies and other insects attempting to enter the trap, to get at the bait, are killed by electricity, the object of the invention being to provide an improved trap of this kind which is cheap and simple in construction, which may be readily kept in order and which operates automatically to destroy flies and other like insects.

The invention consists in the construction, combination and arrangement of devices hereinafter described and claimed.

In the accompanying drawings:—Figure 1 is an elevation of an electric fly trap constructed in accordance with my invention. Fig. 2 is a vertical sectional view of the same. Fig. 3 is a plan of the same. Fig. 4 is a detail view.

The corner posts 1 of my improved trap are made of insulating material, such for instance glass or hard rubber and the top 2 and bottom 3 may be made of any suitable material, such for instance tin or wood. The top has a central opening 4 and a door 5 to cover said opening. At the lower end of the trap are supporting legs 6 which may be extensions of the corner posts.

In the trap at a suitable distance above the bottom, is a platform 7 on which suitable bait may be placed. This platform is supported on rods 8 which connect the posts 1. At the top of the trap is a bail 9, hinged at 10 and by means of which the trap may be carried from place to place. The sides of the trap are formed by wires 11—12 which extend around the four sides of the trap and the coils of which are slightly spaced apart, in practice about one fourth of an inch apart, to leave openings through which flies may pass in entering the trap and to cause the flies when entering the trap to touch both the wire 11 and the wire 12 and hence short circuit the same, the terminals 11ª—12ª of the wires, at the top of the trap, being adapted for attachment to the poles of an electric generator of any suitable type, or to electric feed wires in a house or building. Hence the wires 11—12 are oppositely electrified and a fly or other insect in passing between the wires in entering the trap will effect the short circuit and hence be killed, by the electric current. The posts 1 will be provided with suitable shallow notches for engagement by the coils or wires and to hold the wires in place. Any other suitable means may be employed for this purpose within the scope of my invention.

To prevent persons from touching the live wires 11—12 and being shocked I provide guards 14 which are arranged about two inches apart, are arranged vertically and are secured at their upper and lower ends to rims 15 which are supported on corner arms 16 that extend out from the top and bottom of the trap. The door 5 enables bait to be readily placed in the trap or removed therefrom.

While I have herein shown and described a preferred form of my invention, I would have it understood that changes may be made in the form, proportion and construction of the several parts without departing from the spirit of the invention and within the scope of the appended claims.

Having thus described my invention, I claim:—

1. The herein described electric fly trap comprising insulating corner posts, top and bottom members connecting the corner posts and provided with outwardly extending arms, rims attached to said arms and supported thereby around and in spaced relation to the body of the trap, electric conducting wires of opposite potential disconnected from each other and coiled around and forming the sides of the trap, said conducting wires being arranged in spaced relation to each other and attached to the corner posts and guards arranged in spaced relation to each other and attached to the said rims and arranged around and in spaced relation to the sides of the trap.

2. The hereindescribed electric fly trap comprising top and bottom members provided with outwardly extending arms, rims attached to said arms and supported thereby, corner posts secured to said top and bottom members at spaced distance apart and provided with a plurality of wire holding notches therein, electric conducting wires of opposite potential disconnected from each other and coiled around and forming the sides of the trap, said conducting wires being arranged in spaced relation to each other and wound around the corner posts, and guards arranged in spaced relation to each other and attached to said rims for preventing any one handling the trap from coming in contact with the electric wires.

3. An electric fly trap of the class described comprising a top and bottom member, corner posts positioned on said top and bottom members, said members provided with outwardly extending arms, said corner posts provided in their body with a plurality of spaced notches, rims attached to said arms and supported thereby around in spaced relation to the body of the trap, electric conducting wires of opposite potential disconnected from each other and coiled around said posts forming the sides of the trap, said conducting wires being arranged in spaced relation to each other, a plurality of vertical guides at a relatively spaced distance apart secured to said rims on the outer side of said corner posts, a bait holding platform supported by the corner posts intermediate their ends and means in the top member communicating with the interior of said wires that are wound around said corner posts.

WILLIAM A. BASS.

Witnesses:
R. R. MURPHY,
J. T. GILBERT.